US006990126B2

(12) United States Patent
Tejada et al.

(10) Patent No.: US 6,990,126 B2
(45) Date of Patent: Jan. 24, 2006

(54) SYSTEMS AND METHODS FOR PRODUCING SUPERRADIANCE USING MOLECULAR MAGNETS

(75) Inventors: Javier Tejada, Barcelona (ES); Joan M. Hernandez, Barcelona (ES); Roger Amigo, Sant Feliu de Llobregat (ES); Ronald F. Ziolo, Webster, NY (US)

(73) Assignee: Xerox Corporation, Stamford, CT (US)

( * ) Notice: Subject to any disclaimer, the term of this patent is extended or adjusted under 35 U.S.C. 154(b) by 425 days.

(21) Appl. No.: 10/303,825

(22) Filed: Nov. 26, 2002

(65) Prior Publication Data

US 2004/0100997 A1     May 27, 2004

(51) Int. Cl.
*H01S 3/00*     (2006.01)
(52) U.S. Cl. ............................. 372/1; 372/37
(58) Field of Classification Search .................. 372/1, 372/37
See application file for complete search history.

(56) References Cited

U.S. PATENT DOCUMENTS

| | | | |
|---|---|---|---|
| 6,351,482 B1 * | 2/2002 | Puzey | 372/99 |
| 6,912,235 B2 * | 6/2005 | Anthon et al. | 372/29.02 |
| 2003/0066968 A1 * | 4/2003 | Ziolo | 250/341.1 |

OTHER PUBLICATIONS

Del Barco, et al., Quantum coherence in Fe8 molecular nanomagnets, 1999, Europhysics Letters, 47(6), pp722-728.*
Garcia-Santiago, A. et al., "Enhanced pinning in a magnetic-superconducting bilayer," Applied Physics Letters, vol. 77, No. 18, Oct. 30, 2000, pp. 2900-2902.
Wieghardt, Karl et al., "Hydrolysis Products of Monomeric Amine Complex $(C_6H_{15}N_3)FeCl_3$: The Structure of the Octametric Iron(III) Cation of $\{[(C_6H_{15}N_3)_6Fe_8(\mu_3\text{-}O)_2(\mu_2\text{-}OH)_{12}]Br_7(H_2O)\}BR\cdot 8H_2O$," Angew. Chem. Int. Ed. Engl. 23 (1984) No. 1, pp. 77-78.
Lis, T, "Preparation, Structure, and Magnetic Properties of a Dodecanuclear Mixed-Valence Manganese Carboxylate," Acta Cryst. (1980), B36, pp. 2042-2046.
"Forbidden Zone," New Scientist, Sep. 14, 2002, pp. 34-37.

* cited by examiner

*Primary Examiner*—Ramon M. Barrera
(74) *Attorney, Agent, or Firm*—Oliff & Berridge, PLC

(57) ABSTRACT

Superradiance is generated by generating coherent radiation in the 10 gigahertz ($10^{10}$) to terahertz ($10^{12}$) regions of the electromagnetic spectrum. The radiation is produced by pulsing a micro crystal of a molecular magnet in a cavity or between a pair of superconductor mirrors at Kelvin or milli-Kelvin temperatures. The coherence and source of the radiation result from enhanced quantum mechanical spin tunneling. Alternatively, the radiation may be obtained by moving the crystal in and out of the field of a permanent magnet.

23 Claims, 8 Drawing Sheets

SYSTEMS AND METHODS FOR PRODUCING SUPERRADIANCE USING MOLECULAR MAGNETS

BACKGROUND OF THE INVENTION

1. Field of Invention

This invention relates to systems and methods for producing superradiance using molecular magnets.

2. Description of Related Art

Terahertz radiation has recently been shown to be important in communications and in imaging tissue and other soft materials. For example, studies have shown that terahertz radiation could be used in early detection of skin cancer.

However, the generation of terahertz radiation, as used today, is not satisfactory. For example, the generation of terahertz radiation used for quality control in the manufacture of integrated circuits is accomplished by the use of high cost, room-sized equipment. Presently, no molecular source of radiation in the 10 gigahertz ($10^{10}$) to terahertz ($10^{12}$) region of the electromagnetic spectrum is available.

SUMMARY OF THE INVENTION

Thus, low cost miniature electronic devices for producing terahertz radiation are desirable. Such cheaper and smaller high gigahertz through terahertz radiation sources would be demanded in many applications, particularly in the telecommunications and imaging industries.

This invention provides systems and methods for generating gigahertz and terahertz radiation using molecular magnets.

This invention separately provides systems and methods for generating gigahertz and terahertz radiation using a solid state crystal molecular magnet.

This invention separately provides systems and methods for generating gigahertz and terahertz radiation using molecular magnets by applying a changing magnetic field to the molecular magnets.

This invention additionally provides systems and methods for applying the changing magnetic field to the molecular magnets by generating a time varying magnetic field around the molecular magnets.

This invention further provides systems and methods for applying the changing magnetic field to the molecular magnets by moving a crystal magnet between the poles of a permanent magnet.

This invention additionally provides systems and methods for applying the changing magnetic field to the molecular magnets by moving the molecular magnet between the poles of a permanent magnet.

This invention separately provides systems and methods for generating coherent radiation from molecular magnets using a cavity effect.

This invention separately provides systems and methods for generating coherent radiation from a solid state single crystal of a molecular magnet using the cavity effect.

This invention separately provides systems and methods for generating radiation from magnetic materials by using giant magnetic relaxation of the magnetic materials.

This invention separately provides systems and methods for generating radiation from magnetic materials by using enhanced magnetic spin tunneling.

This invention separately provides methods and devices for generating radiation from magnetic materials by using Dicke superradiance.

Various exemplary embodiments of the systems and methods according to this invention provide generation of coherent 10 micron to 10 millimeter wavelength (10 gigahertz (GHz) to terahertz (THz)) radiation. In various exemplary embodiments of the systems and methods of this invention, the radiation is produced by pulsing a magnetic field around a crystal of a molecular magnet in a resonant cavity. In various exemplary embodiments of the systems and methods of this invention, the changing magnetic field is obtained by mechanically moving the crystal in and out of the magnetic field generated by a permanent magnet.

In various exemplary embodiments, the coherence and source of the radiation result from enhanced quantum-mechanical spin tunneling, and can be used to generate Dicke superradiance. In various exemplary embodiments of the systems and methods of this invention, the radiation is produced by applying a changing magnetic field to a crystal of a molecular magnet between Fabry-Perot superconductor mirrors. In various exemplary embodiments, the Fabry-Perot superconductor mirrors are held at Kelvin or milli-Kelvin temperatures. In various exemplary embodiments, the changing magnetic field is a one tesla magnetic field.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
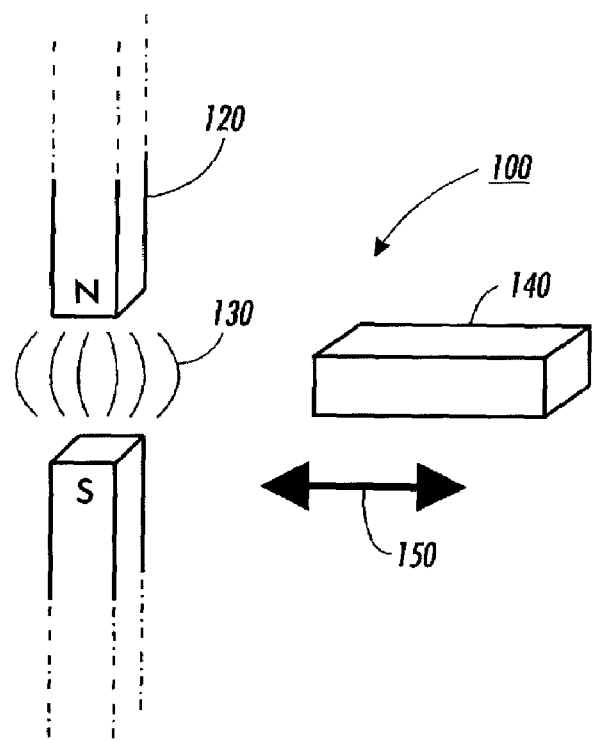
FIG. 1 illustrates a first exemplary embodiment of a superradiance generating device according to this invention having a fixed magnetic field where the relative position of a cavity containing a crystal magnet and the magnetic field is altered.

FIG. 1 illustrates a first exemplary embodiment of a superradiance generating device 100 usable to apply or impose a changing or time-varying magnetic field on a magnet. It should be appreciated that, according to this invention, the changing or time-varying magnetic field refers to the state of the magnetic field as experienced by the frame of reference of the magnet, and this does not imply anything about the time-state of the magnetic field in the frame of reference of the magnetic field source. In this exemplary embodiment, the relative position between a superradiance generator 140 and a magnetic field 130 is changed. The magnetic field 130 is illustrated by exemplary magnetic field lines.

As shown in FIG. 1, the superradiance generating device 100 comprises a magnetic field generating device 120, which generates the magnetic field 130, and a control device (not shown) which changes the relative positioning between the superradiance generator 140 and the magnetic field 130. In various exemplary embodiments, the control device moves the superradiance generator 140 in and out of the magnetic field 130. In various other exemplary embodiments, the control device moves the magnetic field generating device 120, and therefore the magnetic field 130, towards and away from the superradiance generator 140. In various exemplary other embodiments, the control device moves both the superradiance generator 140 and the magnetic field generating device 120 such that the relative position between the superradiance generator 140 and the magnetic field 130 is changed.

In various exemplary embodiments, the control device moves the magnet 140 in and out of the magnetic field 130 in a sliding motion. In various other exemplary embodiments, the superradiance generator 140 is moved in a swinging motion. In various other exemplary embodiments, the superradiance generator 140 is moved in a circulating motion. In various exemplary embodiments, the superradiance generator 140 is moved in and out of the magnetic field 130 in a direction that is perpendicular to or at an angle to the direction 150.

In various exemplary embodiments, the magnetic field generating device 120 is a permanent magnet. The permanent magnet provides a static magnetic field with a fixed strength. In such exemplary embodiments, the superradiance generator 140 and the permanent-magnet magnetic field generating device 120 are moved relative to each other by the control device so that the superradiance generator 140 effectively passes between the poles of the permanent-magnet magnetic field generating device 120 along the direction indicated by the direction 150, and thus in and out of the static magnetic field 130. In FIG. 1, a horseshoe magnet is used to illustrate an example of the permanent-magnet magnetic field generating device 120. It should be appreciated that any device that is capable of providing a static magnetic field can be used as the permanent-magnet magnetic field generating device 120.

It should be appreciated that, in various exemplary embodiments, by effectively moving the superradiance generator 140 rapidly in and out of the static magnetic field 130, the changing magnetic field experienced by the superradiance generator 140 is effectively a pulsed or square wave changing magnetic field. That is, the changing magnetic field as experienced by the superradiance generator 140 increases rapidly to the amplitude of the static magnetic field 130 as the superradiance generator 140 enters or moves fully into the static magnetic field 130. This changing magnetic field experienced by the superradiance generator 140 then remains at the amplitude of the static magnetic field 130 until the superradiance generator 140 begins to exit or move out of the static magnetic field 130. The changing magnetic field experienced by the superradiance generator 140 then rapidly decreases to zero as the superradiance generator 140 effectively fully leaves the static magnetic field 130. The changing magnetic field experienced by the superradiance generator 140 then remains at zero until the superradiance generator 140 again begins to enter the static magnetic field.

Figure 2:
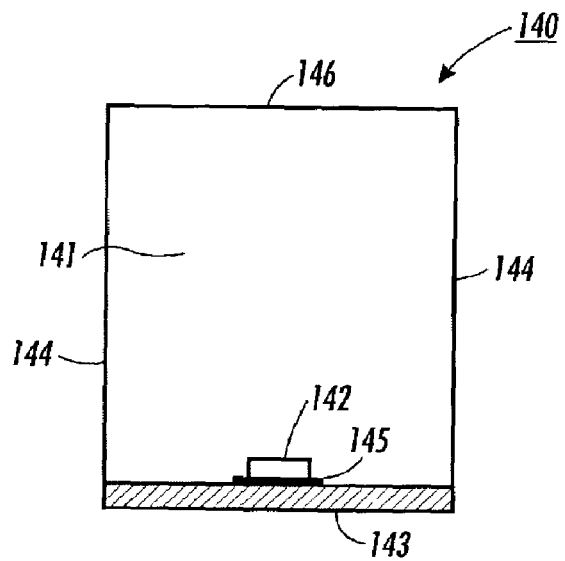
FIG. 2 illustrates a first exemplary embodiment of a superradiance generator containing a cavity containing a crystal magnet according to this invention.

FIG. 2 illustrates a first exemplary embodiment of the superradiance generator 140. As shown in FIG. 2, the superradiance generator 140 includes a crystal 142 mounted in a cavity 141 created within the superradiance generator 140.

In various exemplary embodiments, the cavity 141 includes a space confined between walls. In such exemplary embodiments, a photon emitted from the crystal 142 will be trapped in the cavity 141, bouncing between the walls, until enough photons have been emitted from the crystal 142 and accumulated to a certain number that an "optical explosion" occurs to generate superradiance, as discussed in greater detail below in connection with FIG. 10.

In various exemplary embodiments, the cavity 141 has a dimension that substantially corresponds to an integer multiple of the wavelength of radiation in the 10 gigahertz ($10^{10}$) to terahertz ($10^{12}$) region of the electromagnetic spectrum. Such a dimension ensures that photons emitted from the crystal 142 in the 10 gigahertz ($10^{10}$) to terahertz ($10^{12}$) region will remain coherent, will cause more photon emission from the crystal 142, and the number of photons will accumulate, leading to the occurrence of superradiance.

In various exemplary embodiments, the cavity 141 includes a space between a pair of superconducting mirrors, such as Fabry-Perot superconductive mirrors. The distance between the two mirrors substantially corresponds to an integer multiple of the wavelength of radiation in the 10 gigahertz ($10^{10}$) to terahertz ($10^{12}$) region of the electromagnetic spectrum. In such exemplary embodiments, the crystal 142 can absorb the photons emitted by the crystal 142 to generate more photon emissions from the crystal 142, which ultimately generates superradiance, as discussed in greater detail below.

As shown in FIG. 2, the crystal 142 is attached to a substrate 143 that forms one wall of the cavity 141. In various exemplary embodiments, the crystal 142 is attached to the substrate 143 using an adhesive layer 145. In various exemplary embodiments, the adhesive is a heat-conductive grease. As shown in FIG. 2, a number of wall members 144 and 146 are formed around the magnetic crystal 142 to form the remaining walls of the cavity 141. In various exemplary embodiments, some of the wall members 144 are attached to the substrate 143.

In various exemplary embodiments, the magnet is a molecular magnet. In various exemplary embodiments, the magnet is a crystal magnet. In various exemplary embodiments, the magnet is a solid magnet. In various exemplary embodiments, the magnet is a solid state crystal molecular magnet. In various exemplary embodiments, the crystal 142 is a Fe8 crystal. In various other exemplary embodiments, the crystal 142 is a Mn12 crystal. In various exemplary embodiments, the temperature of the superradiance generator 140 is controlled between 50 mK and 2 K by changing the power dissipation of a resistor (not shown) and measured by using a ruthenium-oxide resistor (not shown).

In various exemplary embodiments, the walls 144 and 146 of the cavity 141 are made of oxygen-free, high conductivity copper. In various exemplary embodiments, the cavity 141 is formed as a cylindrical cavity. In various exemplary embodiments of a cylindrical cavity 141, the cylindrical cavity 141 has a radius R=0.9 mm and a length L=6 mm. In various other exemplary embodiments, the cylindrical cavity has a radius R=0.9 mm and a length L=8 mm. In various exemplary embodiments, the crystal 141 is mounted in the cylindrical cavity with its easy axis mostly parallel to the applied magnetic field. In various exemplary embodiments, the crystal and cavity are totally immersed in a liquid He3–He4 mixture.

In various exemplary embodiments, a Q value is used to measure the effectiveness of a cavity in trapping photons and generating superradiance. In various exemplary embodiments, the Q value for the cylindrical cavity is $10^3$–$10^4$.

In various exemplary embodiments, the cavity 141 has a dimension of 1.6 mm with varying lengths from 4 to 400 mm. In various other exemplary embodiments, the cavity 141 has a dimension of 3.2 mm with varying lengths from 4 to 400 mm. In various exemplary embodiments, the length of the cavity 141 is varied using a micrometric stepping motor control device (not shown). The micrometric stepping motor control device has, for example, a spatial resolution of 1 $\mu$m. The micrometric stepping motor control device is connected, for example, to one the of the walls 144 and 146 of the cavity 141. The micrometric stepping motor control device is typically connected to one the of the walls 144 and 146 by a rod (not shown). The rod is a copper rod although any other metal or conductive material can be used to form the rod. The rod is movable by the micrometric stepping motor to adjust the length of the cavity 141 to fine-tune the Q value of the cavity 141.

In various exemplary embodiments according to this invention, the crystal 142 in the superradiance generator 140 is a single crystal. In various other exemplary embodiments according to this invention, the crystal 142 in the superradiance generator 140 is a plurality of molecules. In various exemplary embodiments according to this invention, the crystal 142 in the superradiance generator 140 is a number of N identical atoms.

Figure 3:
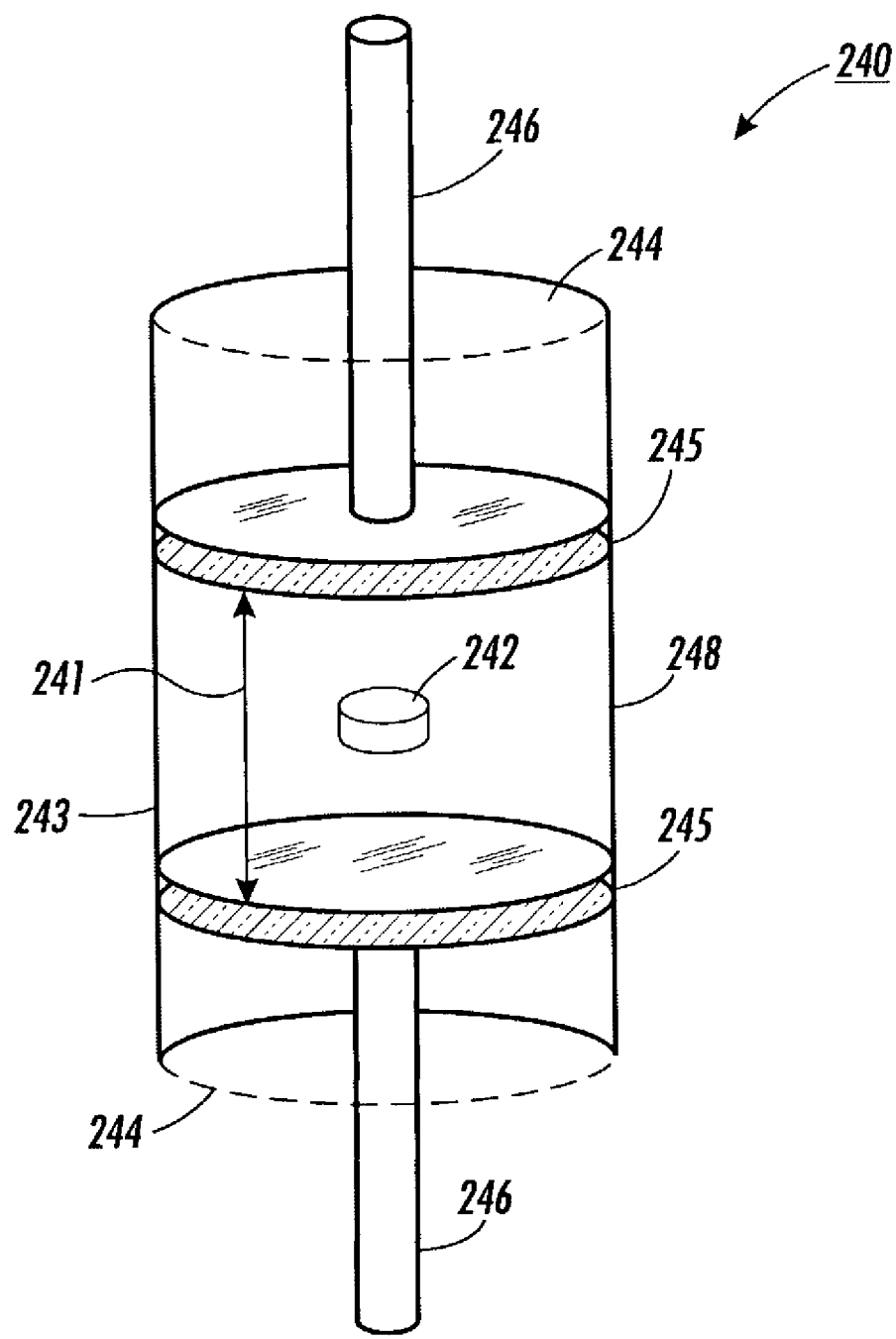
FIG. 3 illustrates a second exemplary embodiment of a superradiance generator comprising a cavity containing a crystal magnet and having a pair of superconducting mirrors according to this invention.

FIG. 3 illustrates a second exemplary embodiment of a superradiance generator according to this invention containing a crystal magnet and having a pair of superconducting mirrors. As shown in FIG. 3, the superradiance generator 240 includes a pair of superconducting mirrors 245. The two superconducting mirrors 245 are parallel with each other and are separated from each other by a distance 241. A crystal 242 is placed between the two mirrors 245 and is attached to a substrate (not shown). In various exemplary embodiments, the crystal 242 is attached to the substrate using an adhesive layer. In various exemplary embodiments, the adhesive is a heat-conductive grease.

In various exemplary embodiments, as shown in FIG. 3, the pair of superconducting mirrors 245 are each connected to a rod 246, which are typically movable. Of course, in various exemplary embodiments, only one of the superconducting mirrors 245 needs to be movable. In such exemplary embodiments, only one rod 246 is provided. In such exemplary embodiments, one or more of the one or more rods 246 are used to adjust or tune the distance 241 between the mirrors 245.

In various exemplary embodiments, the superradiance generator 240 includes walls 243 and 244 which form a housing 248. In such exemplary embodiments, the housing 248 houses the mirrors 245 and the crystal 242. In various exemplary embodiments, the substrate on which the crystal 242 is attached is fixed to the wall 243. As shown in FIG. 3, the housing 248 is a cylindrical housing formed by a side wall 243 and end walls 244. However, it should appreciated that the housing 248 may be formed in other shapes.

In various exemplary embodiments, the pair of superconductive mirrors 245 are Fabry-Perot superconductive mirrors. In various exemplary embodiments, the distance 241 between the superconductive mirrors 245 substantially corresponds to an integer multiple of the wavelength of radiation in the 10 gigahertz ($10^{10}$) to terahertz ($10^{12}$) region of the electromagnetic spectrum that is emitted by the crystal 242.

Figure 4:
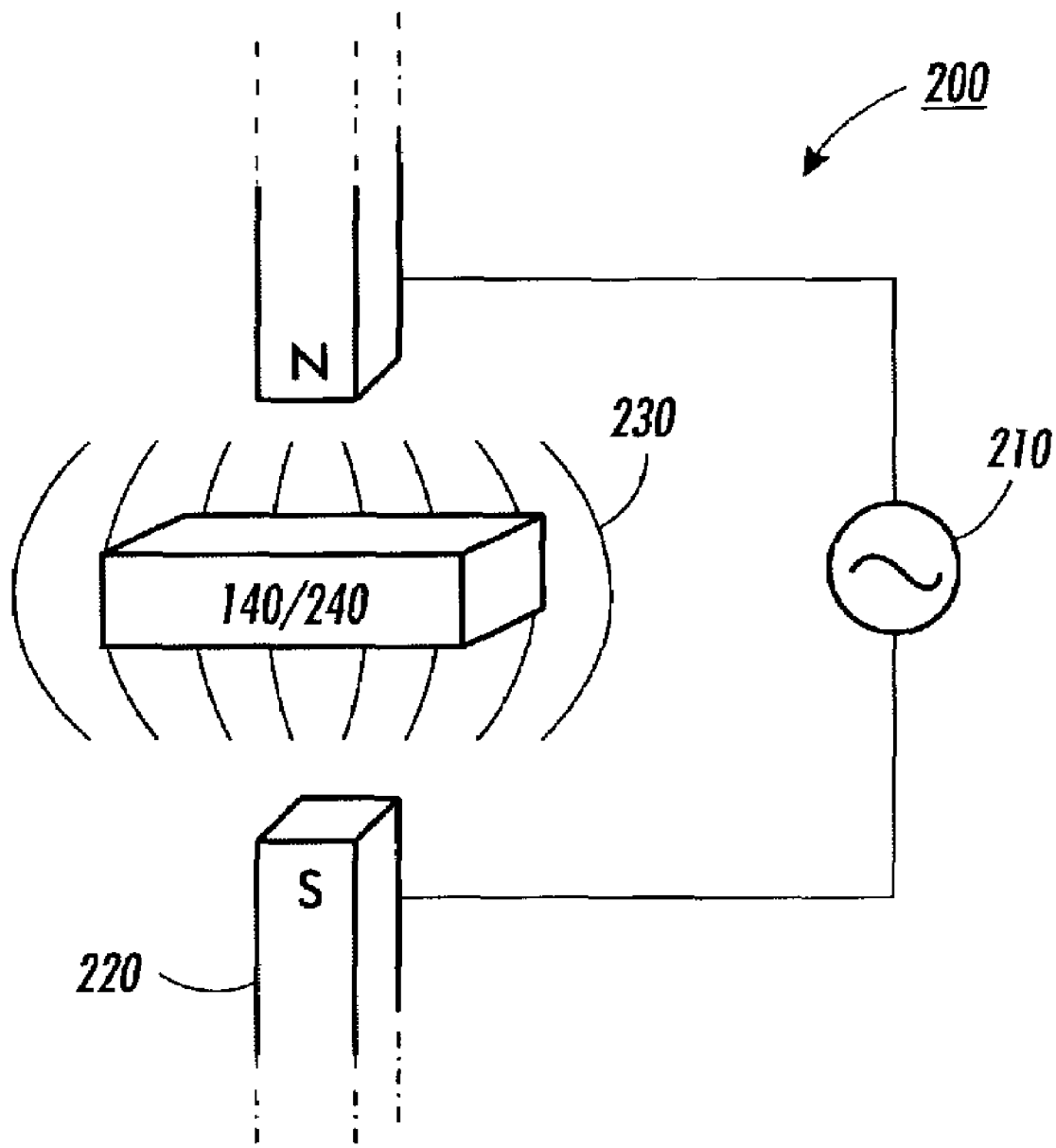
FIG. 4 illustrates a second exemplary embodiment of the superradiance generating device according to this invention having a time varying electric field surrounding a cavity containing a crystal magnet.

FIG. 4 illustrates another exemplary embodiment of a superradiance generating device 200 usable to apply or impose a changing or time-varying magnetic field on a magnet according to this invention. As shown in FIG. 4, the superradiance generating device 200 comprises a switching device 210, a magnetic field generating device 220, and the superradiance generator 140 or 240. In various exemplary embodiments, the superradiance generator 140 shown in FIG. 4 is similar to the superradiance generator 140 or 240 shown in FIG. 2 or 3.

As shown in FIG. 4, the superradiance generator 140 or 240 is placed within a magnetic field 130 (illustrated by exemplary magnetic field lines) generated by the magnetic field generating device 220. In various exemplary embodiments, the magnetic field generating device 220 is an electromagnet, and the magnetic field 130 changes or varies over time in response to a control signal from a field driver device 210.

In various exemplary embodiments, the field driver device 210 is a switch used to allow a drive signal to pass or not pass to turn the magnetic field 130 within the magnetic field generating device 220 on and off. In various other exemplary embodiments, the field driver device 210 is an oscillator that generates and applies a time varying drive signal to the magnetic field generating device 220. In various exemplary embodiments, the time-varying drive signal is substantially a square wave signal or the like such that the magnetic field 130 generated by the magnetic field generating device 220 is generated in pulses. In various exemplary embodiments, the field driver device 210 is capable of adjusting or tuning the strength of the magnetic field generated by the magnetic field generating device 220.

It should be appreciated that, in various exemplary embodiments, by pulsing or switching on and off the magnetic field 230, the changing magnetic field experienced by the superradiance generator 140 is effectively a pulsed or square wave changing magnetic field. That is, the changing magnetic field as experienced by the superradiance generator 140 increases rapidly to the amplitude of the magnetic field 230 as the magnetic field 230 is, for example, switched on. This changing magnetic field experienced by the superradiance generator 140 then remains at the amplitude of the magnetic field 230 until the magnetic field 230 is, for example, switched off. The changing magnetic field experienced by the superradiance generator 140 then rapidly decreases to zero as the magnetic field 130 is switched off. The changing magnetic field experienced by the superradiance generator 140 then remains at zero until the magnetic field 230 is again switched on.

In various exemplary embodiments, the magnet 142 or 242 is a crystal magnet. In various other exemplary embodiments, the magnet 142 or 242 is a solid-state magnet. In various other exemplary embodiments, the magnet 142 or 242 is a molecular magnet.

Figure 5:
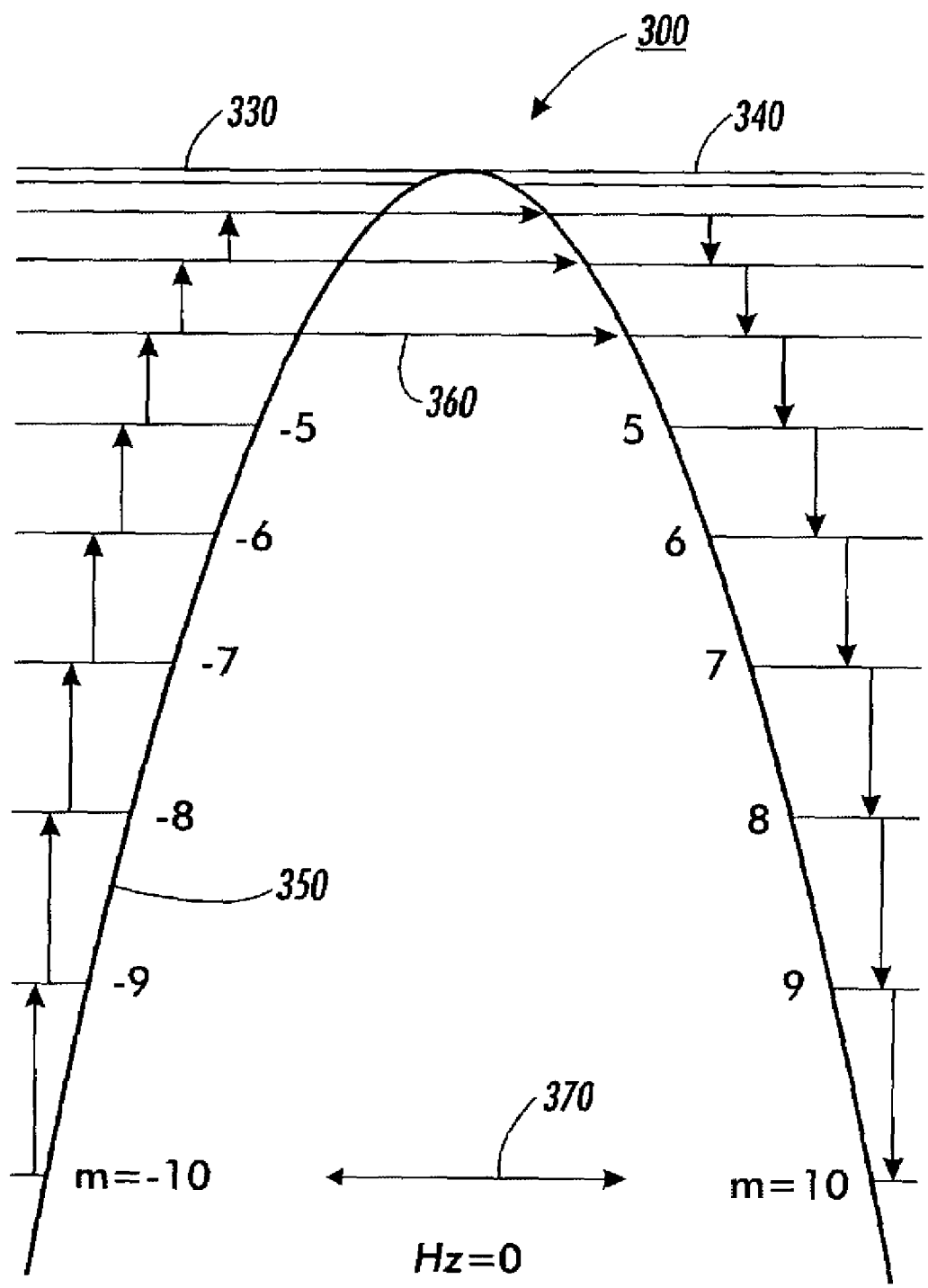
FIG. 5 illustrates thermally assisted spin tunneling in spin-10 molecular magnets used in one exemplary embodiment of the superradiance generating device according to this invention.

FIG. 5 illustrates thermally assisted spin tunneling in spin-10 molecular magnets used in various exemplary embodiments of the superradiance generating device according to this invention. As shown in FIG. 5, molecular magnets such as Dodecanuclear Manganese Carboxylate ($Mn_{12}$) and Octameric Iron ($Fe_8$) may have one of a plurality of quantum magnetic moment states, or spins, in a resonant field 300 established in response to a magnetic field. Exemplary procedures for preparing $Mn_{12}$ and $Fe_8$ are described, respectively, in "Preparation, Structure, and Magnetic Properties of a Dodecanuclear Mixed-Valence Manganese Carboxylate," by T. Lis, Acta Crystallogr., Sect. B36, 2042 (1980), and in "Hydrolysis Products of the Monomeric Amine Complex (CHN)FeCl: The Structure of the Octamieric Iron (III) Cation of $\{[(C_6H_{15}N_3)Fe_8(\mu_3\text{-}O)_2(\mu_2\text{-}OH)_{12}]Br_7(H_2O)\}Br.8H_2O$," by K. Wieghardt et al., Angewandte Chemie Int. Ed. Eng. 23, 77 (1984). In various exemplary embodiments, $Mn_{12}$ and $Fe_8$ magnets are used because they are high spin molecules (S=10). A high spin molecule contains a relatively high number (e.g., an index of 10) of unpaired electrons.

As illustrated in FIG. 5, for, the magnetic moment states are labeled m=−10, −9, −8, ... 8, 9 and 10. The letter "m" denotes the total quantum spin state of a molecule in the direction of the applied magnetic field.

FIG. 5 shows spin-up states 330, which are the magnetic moment states on the left-hand side of FIG. 5 and are associated with negative magnetic moment values (−m). FIG. 5 also shows spin-down states 340, which are the magnetic moment states on the right hand side of FIG. 5 and are associated with positive magnetic moment values (+m). The n-shaped anisotropic energy barrier 350 yields a bi-stability shown in FIG. 5. The anisotropic energy barrier 350 is 65 K and 30 K for $Mn_{12}$ and $Fe_8$, respectively. Thus, the magnetic moment state of the $Mn_{12}$ and $Fe_8$ molecular magnets is stable in a magnetic field.

In absence of any thermal effects, when there is no magnetic field (zero magnetic field), a molecular magnet has a ground state 310 corresponding to the magnetic moment states m=−10 and m=10. The magnetic moment state of the molecular magnet may freely flip between m=−10 and m=10, as indicated by the tunneling path 370 extending between the m=−10 and m=10 states. When a magnetic field, such as the magnetic field 130, is applied to the molecular magnet, the spin can enter an excited magnetic moment state. The excited magnetic moment state 320 is one of the states labeled m=−9, −8, ... 8 and 9. These states above the m=−10 and m=10 are states representing higher energy quantum states. Of course, in absence of an applied magnetic field, thermal energy can cause the same effects.

When the magnetic field 130 is switched off, or when the magnet is move away from the magnetic field 130, the magnetic moment state m of the magnet 142 or 242 tends to return to the base or ground level m=−10 or m=10 because of the tendency of reaching thermal equilibrium. When the spin state releases and travels down the spin state staircase on the same side of the anisotropic energy barrier 350 that was traveled up, the energy is released as thermal energy. Because of magnetic relaxation or hysteresis, the molecular magnets remain in the excited spin slates labeled m=−9, −8, ... 8 and 9 for a short period of time after the strength of the magnetic field 130 has become zero. During this short period of time, the magnetic moment state of the magnet may tunnel through the anisotropic energy barrier 350 due to thermal effects. As shown in FIG. 5, when spin tunneling 360 occurs through the anisotropic energy barrier 350, the spin of the magnetic molecule flips from a spin-up state (+m) 330 to a spin-down state (−m) 340.

When the temperature of the magnet is low, for example, below a temperature of the material called a blocking temperature, compared to the anisotropy energy barrier 350, the magnetic relaxation is dominated by a quantum tunneling 360 through the barrier 350. In various exemplary embodiments, the temperature of the magnet is controlled below the blocking temperature of the magnet. In various exemplary embodiments, the temperature of the magnet is controlled at Kelvin temperatures, or even at milli-Kelvin temperatures.

Figure 6:
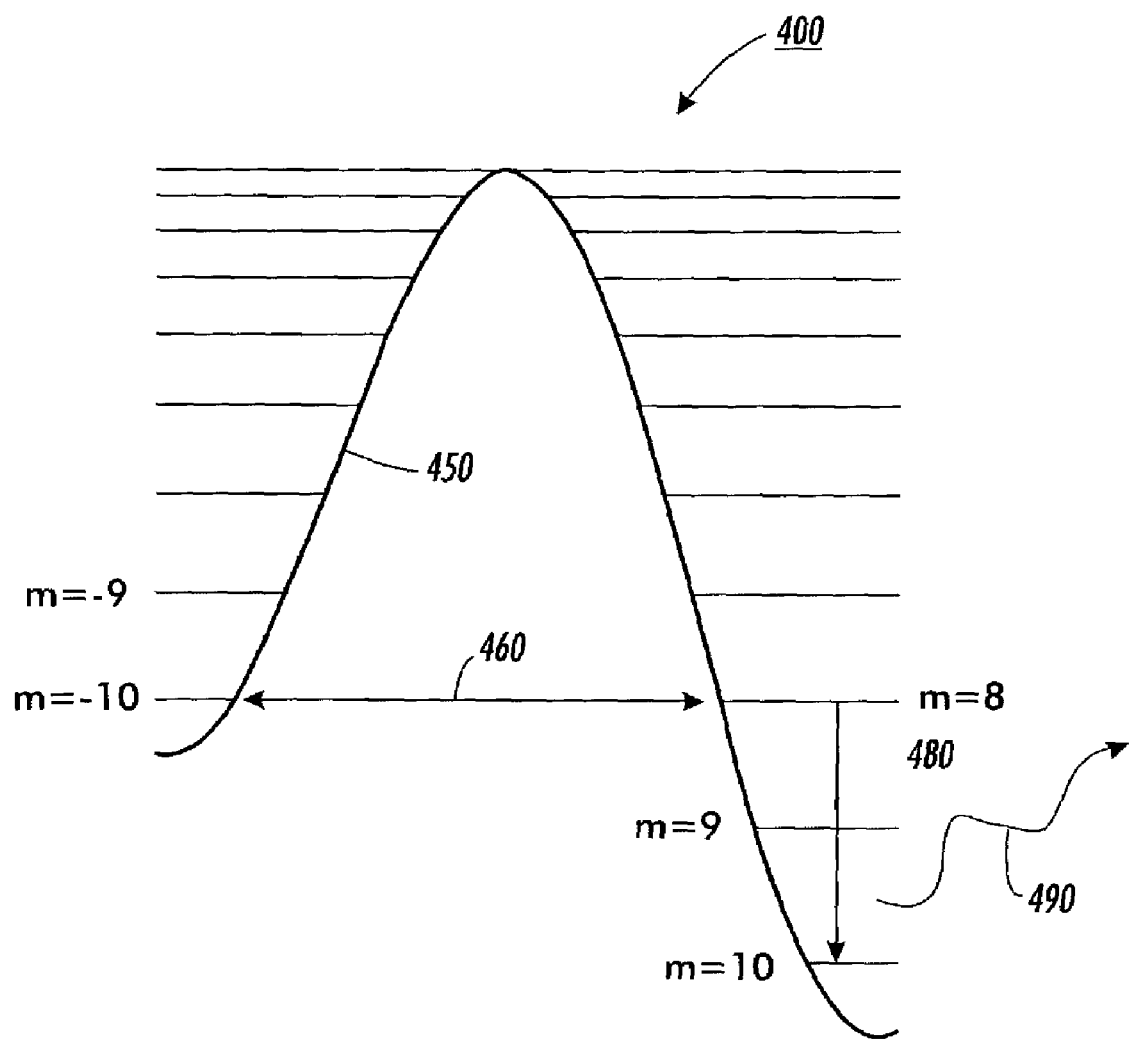
FIG. 6 illustrates photon emission caused by spin tunneling and cascading to lower energy states in molecular magnets used in one exemplary embodiment of the superradiance generating device according to this invention.

FIG. 6 illustrates spin cascading 480 and subsequent photon emission 490 caused by spin tunneling in molecular magnets used in one exemplary embodiment of the superradiance generating device according to this invention. In FIG. 5, in absence of the applied magnetic field 130, the spin tunneling path 370 extends between the spin states m=−10 and m=10. As shown in FIG. 6, in contrast to FIG. 5, when the magnetic field 130 is applied to the magnet 142 or 242, the degeneracy or equivalence of quantum spin states is removed between the spin-up quantum levels and the spin-down quantum levels, and tunneling by the path 370 extends between the spin states m=−10 and m=8, for example. That is, the spin state of a magnetic molecule tunnels between the spin states m=−10 and m=8 while the magnetic field 130 is applied to the magnet 142 or 242.

After the magnetic field 130 is withdrawn, the equivalence or degeneracy of spin states is reasserted, such that the tunneling path 370 returns to the state shown in FIG. 5. Consequently, the spin state of the magnetic molecule cannot tunnel back from the spin state m=8 to the spin state m=−10. As a result, the only way for the spin state to return from the higher-energy spin state m=8 to one of the base states m=−10 or m=10 is for the spin state of the magnetic molecule to cascade down the spin level staircase of the spin-down states to the ground state m=10.

Thus, after the spin state has tunneled through the anisotropic energy barrier 450 shown in FIG. 6, when the inequivalence has been asserted, the spin cascades down to the base or ground spin state but on the opposite side of the anisotropic energy barrier 350. As a result, energy is released in the form of phonons, photons or both.

The amount of energy released during this cascade is determined by the beginning and ending spin levels of each jump along the cascade. For example, the amount of energy released in a jump from the m=8 state to the m=10 state is larger than that released during a jump from the m=9 state to the m=10 state. The wavelength of the emitted photon associated with the release of energy corresponds to the energy difference between the beginning and ending spin levels of the jump.

In various exemplary embodiments, the energy differences between two excited levels 320 are correspond to wavelengths of radiation in the 10 gigahertz ($10^{10}$) to terahertz ($10^{12}$) region of the electromagnetic spectrum. In various exemplary embodiments, the strength of the magnetic field applied to the molecular magnets are fine-tuned to facilitate energy differences between different excited levels 320 corresponding to wavelengths of radiation in the 10 gigahertz ($10^{10}$) to terahertz ($10^{12}$) region.

In various exemplary embodiments according to this invention, the photon emission rate of a molecular magnet is enhanced by applying or imposing a changing or time-varying magnetic field on the magnet. As discussed above, in various exemplary embodiments, the magnetic field is changed by moving the magnet in and out of the magnetic field. In various other exemplary embodiments, the magnetic field is changed by switching or oscillating the magnetic field.

Figure 7:
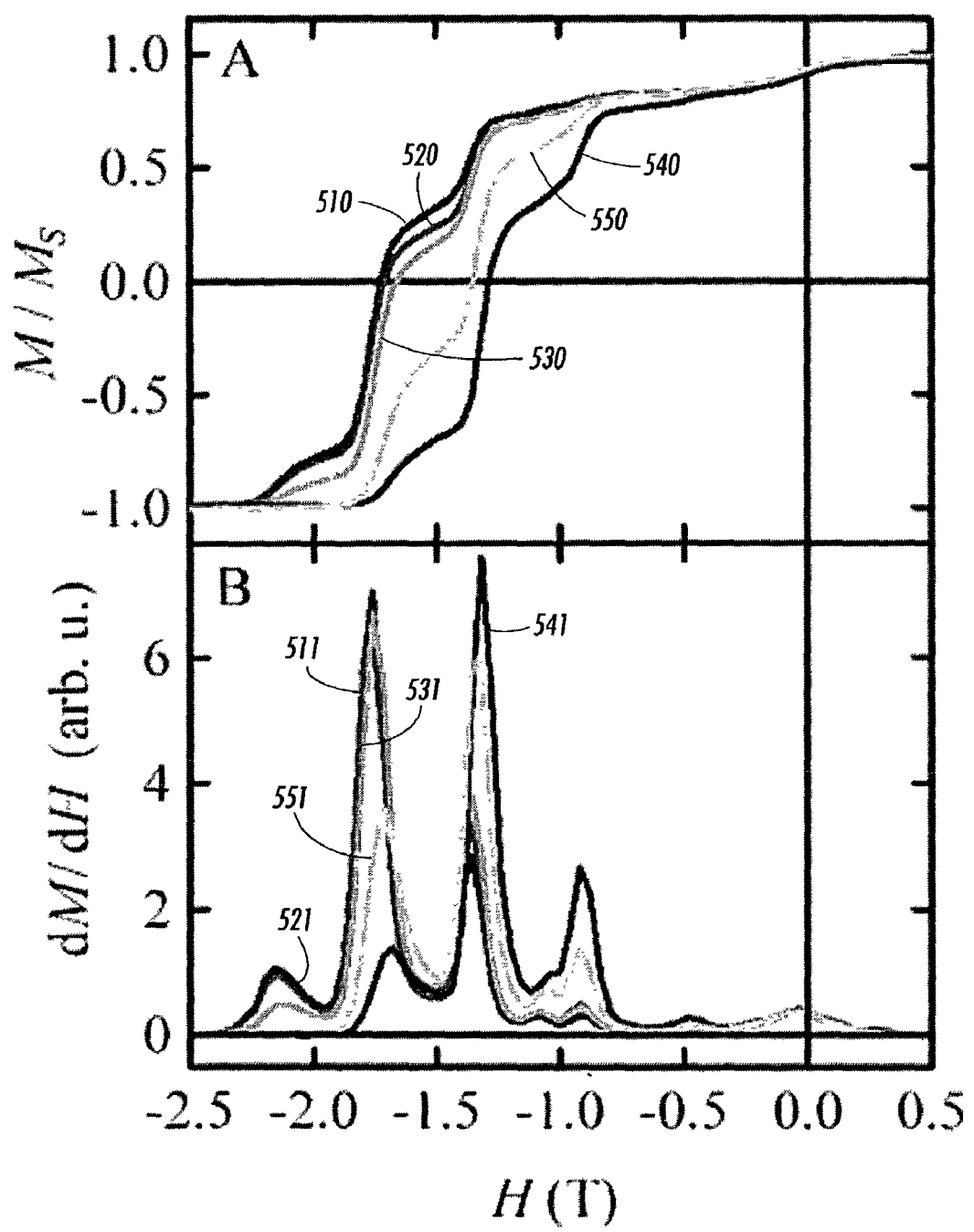
FIG. 7 depicts demagnetization curves and their field derivatives of magnetization produced in one exemplary embodiment of the superradiance generating device according to this invention.

FIG. 7 depicts demagnetization curves and their field derivatives of magnetization produced in one exemplary embodiment of the superradiance generating device according to this invention. Particularly, FIG. 7A shows the magnetization curves, M(H), of a Mn12-acetate crystal at a temperature T of 2° K inside a resonant cavity having a diameter of 1.6 mm. The length of the resonant cavity is varied to obtain different demagnetization curves. Specifically, for the various curves shown in FIG. 7, the length of the cavity is 21.0 mm, 20.9 mm, 20.1 mm, 19.8 mm, and 19.5 mm for the curves 510, 520, 530, 540 and 550, respectively. As shown in FIG. 7A, the magnetic relaxation varies with the variation of the length of the cavity.

FIG. 7B shows the field derivatives of magnetization, dM/dH, for the curves shown in FIG. 7A. As shown in FIG. 7B, the curves 511, 521 and 531 demonstrate a pronounced derivative when the absolute value of the magnet field strength is about 1.8 tesla. Furthermore, the curves 541 and 551 demonstrate a pronounced derivative when the absolute value of the magnetic field strength is about 1.3 tesla. The giant magnetic relaxation associated with such pronounced derivatives reveals a combination of cavity dimensions and magnetic field strength to produce enhanced magnetic spin tunneling for superradiance. Accordingly, in various exemplary embodiments, a cavity of diameter 1.6 mm and a length of about 21.0 mm is used with an absolute value for a magnet field strength of about 1.8 tesla to produce enhanced magnetic spin tunneling. In various exemplary embodiments, a cavity of diameter 1.6 mm and a length of about 19.5 mm is used with an absolute value for a magnet field strength of about 1.3 tesla to produce enhanced magnetic spin tunneling.

Figure 8:
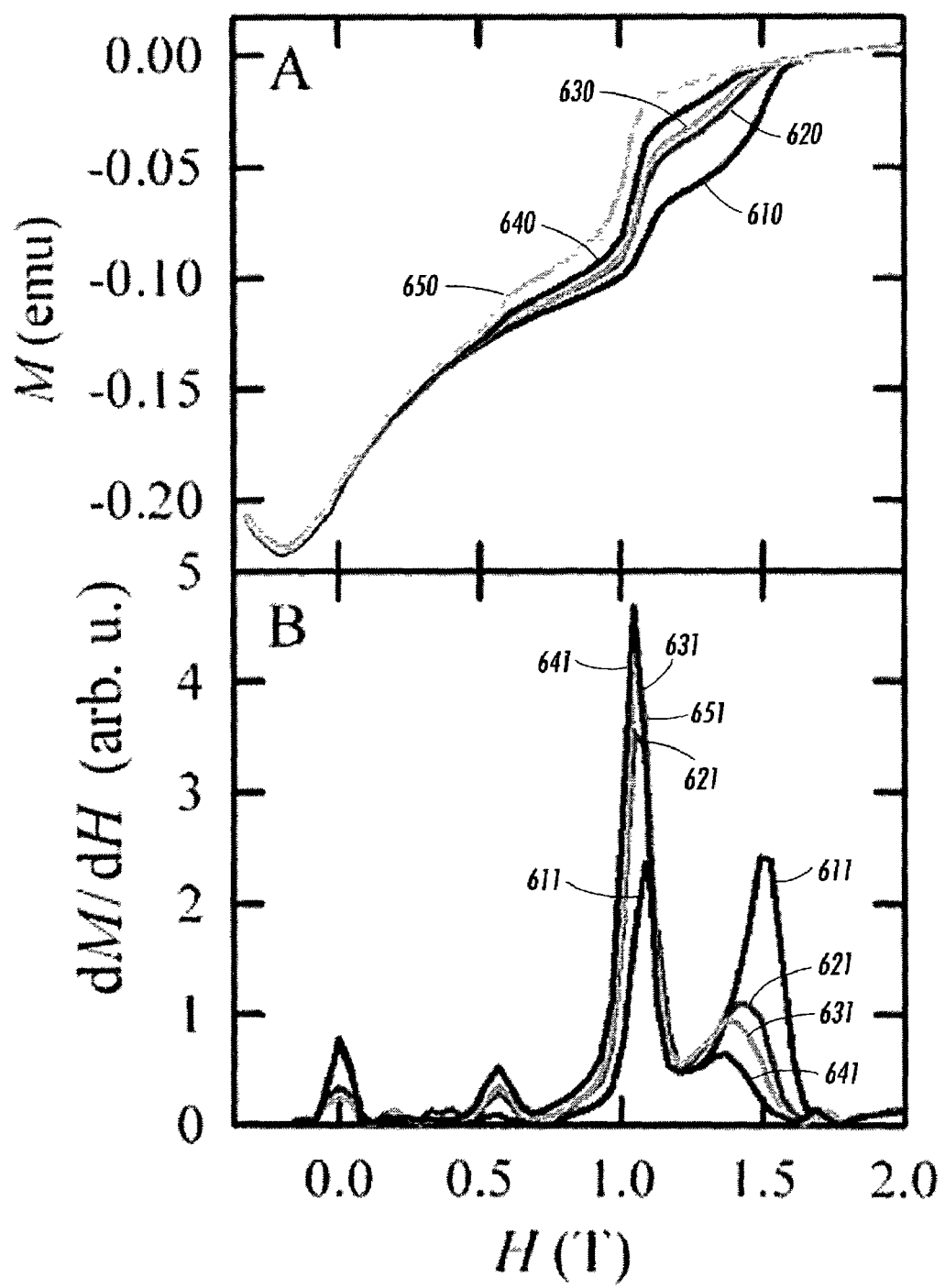
FIG. 8 depicts demagnetization curves and their field derivatives of magnetization produced in another exemplary embodiment of the superradiance generating device according to this invention.

FIG. 8 depicts demagnetization curves and their field derivates of magnetization produced in another exemplary embodiment of the superradiance generating device according to this invention. Particularly, FIG. 8A shows the magnetizing curves, M(H), of a pair of Fabry-Perot superconductive mirrors that are held at a temperature T=2.0 K for 5 different distances between the pair of superconducting mirrors. Specifically, the 5 different distances are 4.3 mm, 4.7 mm, 5.1 mm, 5.3 mm, and 6.0 mm, for curves 610, 620, 630, 640 and 650, respectively.

FIG. 8B shows the field derivatives of magnetization, dM/dH, determined from the demagnetization curves shown in FIG. 8A. As shown in FIG. 8B, a distance between the superconducting mirrors in the range of 4.7 mm and 6.0 mm (curves 621, 631, 641 and 651, respectively), coupled with a magnetic field strength having an absolute value of 1.1 tesla, generates giant magnetic relaxation. On the other hand, curve 611 does not seem to be associated with such giant relaxation. Accordingly, in various exemplary embodiments, a pair of superconducting mirrors placed from each other at a distance in the range of 4.7 mm and 6.0 mm is used with a magnet field strength having an absolute value of about 1.1 tesla to produce enhanced magnetic spin tunneling for generating superradiance.

Figure 9:
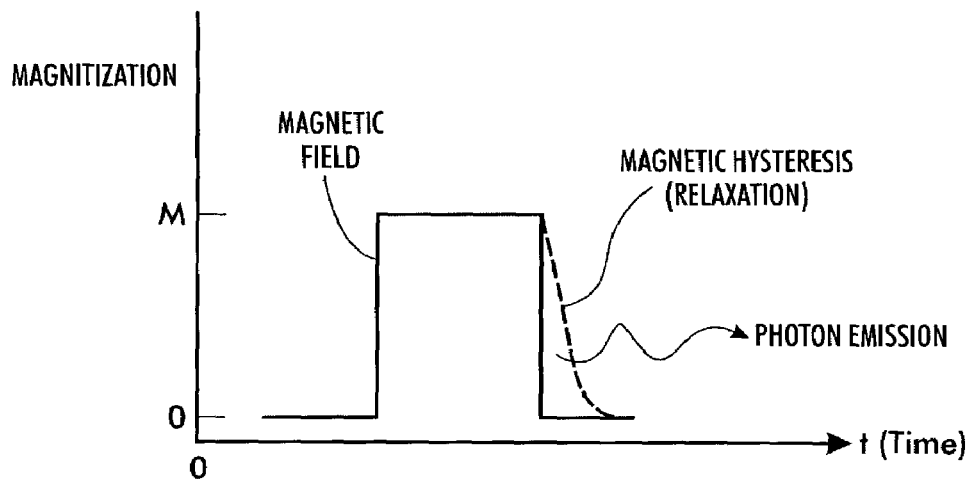
FIG. 9 illustrates the quantum-mechanic response when a crystal magnet experiences a changing magnetic filed according to this invention.

FIG. 9 illustrates the quantum-mechanic response when a crystal magnet experiences a changing magnetic filed according to this invention. As shown in FIG. 9, the magnetic field imposed on a magnet varies between 0 and a certain magnetic field strength M, as represented by the square waves indicated by the solid line. In various exemplary embodiments, magnetic field strength M is tuned to generate desired energy differences between levels of magnetic moment states.

The dash line in FIG. 9 illustrates the magnetic response of the magnet to the changing applied magnetic field. When the magnetic field changes from 0 to M, the magnet is magnetized instantly, such that the dash line collapses with the solid line as indicated in FIG. 9. On the other hand, when the magnetic field changes from M to 0, the magnetic response lags behind, due to hysteresis or magnetic relaxation, during which photon emission occurs. In various exemplary embodiments, the changing magnetic field is repeatedly changed to induce repeated photon emissions.

Figure 10:
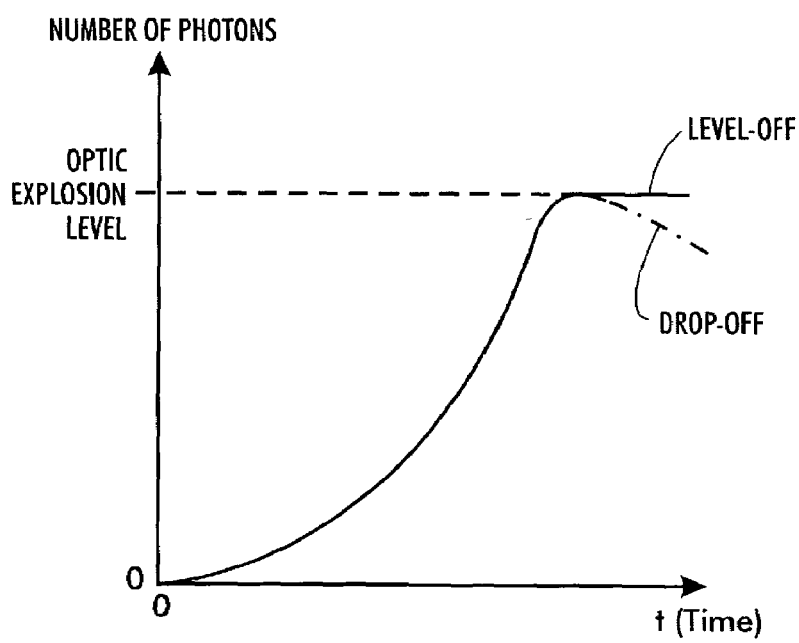
FIG. 10 illustrates superradiance generation produced in a cavity containing a magnetic crystal that experiences a changing magnetic field according to this invention.

FIG. 10 illustrates superradiance generation produced in a cavity, or between superconductive mirrors, containing a magnetic crystal that experiences a changing magnetic field according to this invention. The X-axis indicates time, during which a changing magnetic field is applied to a magnet to enhance photon emission. The Y-axis indicates the number of photons accumulated in the cavity or between superconductive mirrors due to repeated photon emissions.

As shown in FIG. 10, when photons are initially emitted, the accumulation of photons grows slowly. On the other hand, as more and more photons are emitted, the number of accumulated photons grows exponentially, because the emitted photons also excite the magnet to further cause photon emissions. Because the emissions of photons are coherent with each other, the photons accumulate to a level of "optical explosion," at which point superradiance occurs. In various exemplary embodiments, the dimension of the cavity is tuned to adjust a desired level of optical explosion. In various exemplary embodiments, the distance between two superconductive mirrors is tuned to adjust a desired level of optical explosion.

Upon the occurrence of superradiance, the number of accumulated photons levels off if the number of the photons that are continuously emitted is large enough to compensate the number of photons emitted as superradiance. When the number of accumulated photons that are continuously emitted is not large enough, the number of accumulated photons will drop off and the superradiance generating device 140 or 240 will experience a quiescent period before the next optical explosion.

While this invention has been described in conjunction with the exemplary embodiments outlined above, it is evident that many alternatives, modifications and variations will be apparent to those skilled in the art. Accordingly, the exemplary embodiments of this invention, as set forth above, are intended to be illustrative, not limiting. Various changes may be made without departing from the spirit and scope of the invention.

What is claimed is:

1. A method of generating superradiance using a molecular magnet contained in a cavity, comprising:
    changing a magnetic field that is applied to the magnet;
    collecting photons in the cavity; and
    emitting superradiance,
    wherein the housing comprises a pair of superconductive mirrors.

2. The method of claim 1, wherein changing the magnetic field comprises applying a time-varying magnetic field.

3. The method of claim 2, wherein applying the time-varying magnetic field comprises switching the magnetic field on and off.

4. The method of claim 2, wherein applying the time-varying magnetic field comprises oscillating the magnetic field.

5. The method of claim 1, wherein changing the magnetic field comprises moving the magnet in and out of the magnetic field.

6. The method of claim 1, further comprising maintaining the magnet at at most Kelvin temperatures.

7. The method of claim 6, wherein maintaining the magnet at at most Kelvin temperatures comprises maintaining the magnet at at most milli-Kelvin temperatures.

8. The method of claim 1, wherein the cavity is provided in a housing.

9. The method of claim 8, further comprising changing a dimension of the housing.

10. The method of claim 1, wherein the magnet is at least one of at least a molecular magnet, a crystal magnet, a solid magnet, and a solid state crystal molecular magnet.

11. The method of claim 1, wherein the magnet is a manganese or iron molecular magnet.

12. The method of claim 1, wherein changing the magnetic field comprises changing a strength of the magnetic field.

13. A device for generating superradiance using molecular magnets, comprising:
   a magnet located in a cavity;
   a pair of superconductive mirrors positioned around the magnet;
   a magnetic device generating a magnetic field; and
   a control device;
   wherein the control device changes a provision of the magnetic field with respect to the magnet.

14. The device of claim 13, wherein the control device changes the provision of the magnetic field by applying a time-varying magnetic field.

15. The device of claim 13, wherein the control device changes the provision of the magnetic field by switching the magnetic field on and off.

16. The device of claim 13, wherein the control device changes the provision of the magnetic field by oscillating the magnetic field.

17. The device of claim 13, wherein the control device maintains the temperature of the magnet at at most Kelvin temperatures.

18. The device of claim 17, wherein the control device maintains the temperature of the magnet at at most milli-Kelvin temperatures.

19. The device of claim 13, wherein the control device changes the provision of the magnetic field by moving the magnet in and out of the magnetic field.

20. The device of claim 13, wherein the magnet is at least one of at least a crystal magnet, a solid magnet, a molecular magnet, and a solid state crystal of a molecular magnet.

21. The device of claim 13, wherein the magnet is a manganese or iron molecular magnet.

22. The device of claim 13, wherein the control device changes a strength of the magnetic field.

23. The device of claim 13, wherein the control device changes a dimension of the cavity.

* * * * *